(12) United States Patent
Hamilton et al.

(10) Patent No.: US 7,392,222 B1
(45) Date of Patent: Jun. 24, 2008

(54) SYSTEM AND METHOD FOR PROVIDING PROMOTIONAL PRICING

(75) Inventors: Stacy M. Hamilton, Avondale, PA (US); Janet L. Rossiter, Hockessin, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 701 days.

(21) Appl. No.: 10/909,407

(22) Filed: Aug. 3, 2004

(51) Int. Cl.
*G06Q 40/00* (2006.01)

(52) U.S. Cl. .............................. 705/39; 705/10; 705/14; 705/17; 705/26; 705/35; 705/38; 705/40; 705/41; 705/66; 235/379; 235/487

(58) Field of Classification Search ....................... None
See application file for complete search history.

(56) References Cited

U.S. PATENT DOCUMENTS

| | | |
|---|---|---|
| 3,634,669 A | 1/1972 | Soumas et al. |
| 3,946,206 A | 3/1976 | Darjany |
| 4,047,033 A | 9/1977 | Malmberg |
| 4,545,838 A | 10/1985 | Minkus |
| 4,582,985 A | 4/1986 | Lofberg |
| 4,594,663 A | 6/1986 | Nagata et al. |
| 4,634,845 A | 1/1987 | Hale et al. |
| 4,642,768 A | 2/1987 | Roberts |
| 4,700,055 A | 10/1987 | Kashkashian |
| 4,750,119 A | 6/1988 | Cohen |
| 4,766,293 A | 8/1988 | Boston |
| 4,831,242 A | 5/1989 | Englehardt |
| 4,882,675 A | 11/1989 | Nichtberger |
| 4,897,533 A | 1/1990 | Lyszczarz |
| 4,906,826 A | 3/1990 | Spencer |
| 4,953,085 A | 8/1990 | Atkins |
| 4,968,873 A | 11/1990 | Dethloff et al. |
| 4,978,401 A | 12/1990 | Bonomi |

(Continued)

FOREIGN PATENT DOCUMENTS

CA 2293321 12/1998

OTHER PUBLICATIONS

Spurgin, Ralph, "Sopininmon! or What's happening in the retail credit card environment", Credit World Journal, Apr. 1997, 7 pages.*

(Continued)

*Primary Examiner*—Harish T Dass
*Assistant Examiner*—John D Scarito
(74) *Attorney, Agent, or Firm*—Hunton & Williams LLP

(57) ABSTRACT

A system and method for providing promotional pricing is disclosed. One or more pricing offers may be provided to a plurality of credit accounts, wherein the pricing offers may be directed to transactions associated with particular products and/or merchants. It may be determined whether a transaction associated with a credit account qualifies for certain pricing offers based on predetermined criteria. A balance incurred through a transaction may be assigned to a promotional bucket associated with a particular pricing offer if the transaction qualifies for the particular pricing offer, or the balance may be assigned to a default bucket if the transaction does not qualify for any pricing offer, thereby causing a total balance to be distributed among the default bucket and the promotional buckets. Payments associated with the credit account may be allocated to the default bucket and the one or more promotional buckets according to a payment hierarchy.

38 Claims, 7 Drawing Sheets

U.S. PATENT DOCUMENTS

| | | |
|---|---|---|
| 5,025,372 A | 6/1991 | Burton |
| 5,080,748 A | 1/1992 | Bonomi |
| 5,095,194 A | 3/1992 | Barbanell |
| 5,117,355 A | 5/1992 | McCarthy |
| 5,175,416 A | 12/1992 | Mansvelt |
| 5,180,901 A | 1/1993 | Hiramatsu |
| 5,191,522 A * | 3/1993 | Bosco et al. .................. 705/4 |
| 5,192,947 A | 3/1993 | Neustein |
| 5,202,826 A | 4/1993 | McCarthy |
| 5,206,803 A | 4/1993 | Vitagliano |
| 5,218,631 A | 6/1993 | Katz |
| 5,276,311 A | 1/1994 | Hennige |
| 5,287,268 A | 2/1994 | McCarthy |
| 5,287,269 A | 2/1994 | Dorrough |
| 5,297,026 A | 3/1994 | Hoffman |
| 5,311,594 A | 5/1994 | Penzias |
| 5,326,960 A | 7/1994 | Tannenbaum |
| 5,339,239 A | 8/1994 | Manabe et al. |
| 5,349,633 A | 9/1994 | Katz |
| 5,350,906 A | 9/1994 | Brody et al. |
| 5,365,575 A | 11/1994 | Katz |
| 5,397,881 A | 3/1995 | Mannik |
| 5,424,524 A | 6/1995 | Ruppert |
| 5,450,477 A | 9/1995 | Amarant |
| 5,459,306 A | 10/1995 | Stein |
| 5,465,206 A | 11/1995 | Hilt |
| 5,466,919 A | 11/1995 | Hovakimian |
| 5,471,669 A | 11/1995 | Lidman |
| 5,477,038 A | 12/1995 | Levine |
| 5,479,494 A | 12/1995 | Clitherow |
| 5,482,139 A | 1/1996 | Rivalto |
| 5,483,444 A | 1/1996 | Heintzeman |
| 5,500,514 A | 3/1996 | Veeneman |
| 5,511,114 A | 4/1996 | Stimson |
| 5,521,363 A | 5/1996 | Tannenbaum |
| 5,530,232 A | 6/1996 | Taylor |
| 5,530,235 A | 6/1996 | Stefik |
| 5,537,314 A | 7/1996 | Kanter |
| 5,544,086 A | 8/1996 | Davis |
| 5,544,246 A | 8/1996 | Mandelbaum |
| 5,553,120 A | 9/1996 | Katz |
| 5,577,109 A | 11/1996 | Stimson |
| 5,578,808 A | 11/1996 | Taylor |
| 5,585,787 A | 12/1996 | Wallerstein |
| 5,590,038 A | 12/1996 | Pitroda |
| 5,608,785 A | 3/1997 | Kasday |
| 5,621,787 A | 4/1997 | Mckoy |
| 5,637,845 A | 6/1997 | Kolls |
| 5,644,727 A | 7/1997 | Atkins |
| 5,649,118 A | 7/1997 | Carlisle |
| 5,664,110 A | 9/1997 | Green |
| 5,675,607 A | 10/1997 | Alesio |
| 5,677,955 A | 10/1997 | Doggett |
| 5,689,100 A | 11/1997 | Carrithers |
| 5,689,650 A | 11/1997 | McClelland |
| 5,703,344 A | 12/1997 | Bezy |
| 5,704,046 A | 12/1997 | Hogan |
| 5,708,422 A | 1/1998 | Blonder |
| 5,710,886 A | 1/1998 | Christensen |
| 5,715,399 A | 2/1998 | Bezos |
| 5,721,768 A | 2/1998 | Stimson |
| 5,727,153 A | 3/1998 | Powell |
| 5,729,693 A | 3/1998 | Holda-Fleck |
| 5,737,421 A | 4/1998 | Audebert |
| 5,745,706 A | 4/1998 | Wolfberg et al. |
| 5,760,381 A | 6/1998 | Stich |
| 5,765,141 A | 6/1998 | Spector |
| 5,770,843 A | 6/1998 | Rose |
| 5,774,870 A | 6/1998 | Storey |
| 5,777,305 A | 7/1998 | Smith |
| 5,777,306 A | 7/1998 | Masuda |
| 5,778,067 A | 7/1998 | Jones et al. |
| 5,787,156 A | 7/1998 | Katz |
| 5,787,404 A | 7/1998 | Fernandez-Holmann |
| 5,802,176 A | 9/1998 | Audebert |
| 5,806,042 A | 9/1998 | Kelly |
| 5,835,576 A | 11/1998 | Katz |
| 5,845,259 A | 12/1998 | West |
| 5,852,811 A | 12/1998 | Atkins |
| 5,857,079 A | 1/1999 | Claus |
| 5,857,709 A | 1/1999 | Chock |
| 5,859,419 A | 1/1999 | Wynn |
| 5,864,609 A | 1/1999 | Cross |
| 5,864,828 A | 1/1999 | Atkins |
| 5,864,830 A | 1/1999 | Armetta |
| 5,870,718 A | 2/1999 | Spector |
| 5,870,721 A | 2/1999 | Norris |
| 5,875,437 A | 2/1999 | Atkins |
| 5,883,810 A | 3/1999 | Franklin |
| 5,884,285 A | 3/1999 | Atkins |
| 5,887,065 A | 3/1999 | Audebert |
| 5,911,135 A | 6/1999 | Atkins |
| 5,911,136 A | 6/1999 | Atkins |
| 5,926,800 A | 7/1999 | Baronowski |
| 5,930,217 A | 7/1999 | Kayanuma |
| 5,937,068 A | 8/1999 | Audebert |
| 5,940,811 A | 8/1999 | Norris |
| 5,955,961 A | 9/1999 | Wallerstein |
| 5,970,480 A | 10/1999 | Kalina |
| 5,974,399 A | 10/1999 | Giuliani et al. |
| 5,987,434 A | 11/1999 | Libman |
| 5,991,750 A | 11/1999 | Watson |
| 6,000,608 A | 12/1999 | Dorf |
| 6,000,832 A | 12/1999 | Franklin et al. |
| 6,009,415 A | 12/1999 | Shurling et al. |
| 6,014,645 A | 1/2000 | Cunningham |
| 6,016,954 A | 1/2000 | Abe et al. |
| 6,032,136 A | 2/2000 | Brake, Jr. et al. |
| 6,036,099 A | 3/2000 | Leighton |
| 6,038,552 A | 3/2000 | Fleischl et al. |
| 6,070,153 A | 5/2000 | Simpson |
| 6,076,072 A | 6/2000 | Libman |
| 6,078,891 A | 6/2000 | Riordan et al. |
| 6,105,865 A | 8/2000 | Hardesty |
| 6,128,598 A | 10/2000 | Walker et al. |
| 6,128,599 A | 10/2000 | Walker et al. |
| 6,129,274 A | 10/2000 | Suzuki |
| 6,161,096 A | 12/2000 | Bell |
| 6,164,533 A | 12/2000 | Barton |
| 6,167,385 A | 12/2000 | Hartley-Urquhart |
| 6,189,787 B1 | 2/2001 | Dorf |
| 6,227,447 B1 | 5/2001 | Campisano |
| 6,243,688 B1 | 6/2001 | Kalina |
| 6,308,268 B1 | 10/2001 | Audebert |
| 6,336,099 B1 | 1/2002 | Barnett et al. |
| 6,341,724 B2 | 1/2002 | Campisano |
| 6,345,261 B1 | 2/2002 | Feidelson et al. |
| 6,373,969 B1 | 4/2002 | Adler |
| 6,374,230 B1 * | 4/2002 | Walker et al. .................. 705/35 |
| 6,429,927 B1 | 8/2002 | Borza |
| 6,434,259 B1 | 8/2002 | Hamid |
| 6,446,210 B1 | 9/2002 | Borza |
| 6,498,861 B1 | 12/2002 | Hamid |
| 6,609,111 B1 | 8/2003 | Bell |
| 6,615,189 B1 | 9/2003 | Phillips et al. |
| 6,625,582 B2 | 9/2003 | Richman et al. |
| 6,641,050 B2 | 11/2003 | Kelley |
| 6,805,287 B2 | 10/2004 | Bishop |
| 7,092,905 B2 * | 8/2006 | Behrenbrinker et al. ....... 705/39 |
| 2002/0095365 A1 | 7/2002 | Slavin |
| 2003/0204421 A1 * | 10/2003 | Houle et al. .................. 705/4 |
| 2003/0216965 A1 | 11/2003 | Libman |
| 2004/0030626 A1 | 2/2004 | Libman |

2004/0039588 A1 2/2004 Libman

OTHER PUBLICATIONS

Song, Time Magazine Article, Monday, Apr. 12, 2004, "A card that asks for ID", 1 page.
Credit Card News, "A store card issuer looks for lift from electronic gift certificates," Feb. 1, 1995, 2 pages.
"Associates First Capital Corporation", Hoover's Inc., The Industry Standard: The Newsmagazine of the Internet Economy, thestandard.net/companies/cpmpany-display, Apr. 6, 1999, 2 pages.
Brehl, "Banks issue cash-card pledge," The Toronto Star, Thursday, Oct. 9, 1997, 1 page.
Block, "Blockbuster running test of stored value card," The American Banker, Sep. 1, 1995, 2 pages.
Meece, "Boatmen's prepaid cards for worker-incentive firm," American Banker, Jul. 2, 1996, p. 12.
"Boatmen's floats stored value into the employee incentive waters," Debit card, News, vol. 2, Issue 2, Jul. 16, 1996, 3 pages.
CardEx Incentives, The Future of Gifts & Incentives, 4/6/199, 15 pages.
Rosen, "Cash just isn't flexible enough," Express Technology, Friday, Feb. 10, 1995, 1 page.
Business Wire, Jan. 15, 1996, "CES/NaBANCO introduces stored value card technology; Blockbuster video is first merchant partner," 2 pages.
Britt, "Competing in auto lending," America's Community Banker, vol. 5, No. 11, pp. 33-37, Nov. 1996.
Card News, "D.C. area Safeway stores look for increase in sales volume and revenue with cards," vol. 6, No. 25, ISSN: 0894-0797, Monday, Dec. 30, 1991, 3 pages.
Piskora, "Debit cards seen poised for new markets," American Banker, Credit/Debit/ATM's, Tuesday, Mar. 7, 1995, p. 16.
Sanchez-Klein, "Electronic purse" alliance planned, Computerworld, Jul. 29, 1998, printed Feb. 23, 2001, 2 pages.
Business Times, "Electronic purse can free you from ATM drag," printed Feb. 23, 2001, 1 page.
News Clippings, "'Electronic purse card' to be launched tomorrow," New Straits Times, Sep. 18, 1999, printed Feb. 23, 2001, 3 pages.
Cards International, Jan. 30, 1996, "First data markets stored-value cards," p. 5.
Norris, First data unit develops blockbuster cash card, Omaha World Herald, Jan. 19, 1996, Sunrise Edition, p. 16.
Welcome to Card Express, The CardEx Incentive Card, as disclosed in the CardEx web site archived by web.archive.org on Feb. 7, 1998 [http://web.archive.org/web/*/http://www.cardex.com], retrieve Oct. 18, 2003, 8 pages.
Welcome to Card Express, CardEx web site archived by web.archive.org on Oct. 31, 1996 [http://web.archive.org/web/*/http://www.cardex.com], retrieve Oct. 18, 2003, 7 pages.
Jeffrey M. Lacker, "Stored Value Cards: Costly Private Substitutions for Government Currency", Economic Quarterly, 1996, 9 pages.
"The Evolution of a New Consumerism", Chain Store Age, vol. 73, pp. 8-9, Jun. 1997, 4 pages.
Fickenscher, "Amex prepaid offering is latest card for firms regarding employees", American Banker, vol. 161, No. 151, Aug. 8, 1996, 2 pages.
"Welcome to Swiftgift", Swiftgift, www.swiftgiftcard.com, Dec. 8, 1998, 10 pages.
Lzarony, "Stuck for a gift? Give a prepaid credit card", www.bankrate.com, Dec. 21, 1998, 2 pages.
Coulton, "Incentives field moving to card-based series 14", American Banker, Mar. 26, 1998, 3 pages.
Business Travel News, "Maritz gets mastercard's stamp of approval", Aug. 19, 1996, 2 pages.
Spurgin, "Sopininmon! or What's happening in the retail credit card environment", Credit World Journal, Apr. 1997, 7 pages.
AT&T Marketing, "Universal card fee lifetime membership extended 3 months", www.att.com/press/0297/970217.csa.html, Dec. 4, 1990, 2 pages.

Chain Store Age Executive with Shopping Center Age, "More retailers turn to co-branding", Feb. 1, 1995, 3 pages.
Introducing SpendingMoney(TM), Armetta: Marketing & Design Product Concept Report, Oct. 9, 1996, 15 pages.
First USA Platinum Connect, First USA Bank, First USA Promotional Mailing, Oct. 1997, 6 pages.
Introducing the First USA Platinum Connect Card, First USA Promotional Mailing, Dec. 1997, 6 pages.
Here's the calling convenience you asked for: 1-800-call-AT&T . . . For All Calls, Appendix A: For Card Carriers, 7 pages.
Miriam Krenin Souccar, Smart Cards: 1st Union Smart Card Pilot Enlists a Second Army Base, American Banker, 3 pages.
First Union Issues Smart Cards to Fort Benning Recruits, CardFax, 1 page.
Emerson Brown and Jim Baum, Purchasing Card Magic: Eli Lilly Finds Accounts Payable Flying High With Plastic, Corporate Cashflow, 4 pages.
Christine Dugas, Payroll May Ask: Paper or Plastic?, USA Today, 3B, Aug. 14, 2001, 1 page.
Rachel Konrad, Associated Press, IBM had a bunch of unusual ideas in 2003, printed from Philly.com on Jan. 21, 2004, posted on Tues., Jan. 13, 2004, 2 pages.
Incentive firms debit cards a rewarding experience (Off-line debit card issuers converge efforts with companies looking for effective incentives to boost employee productivity and to motivate individuals to buy their products), Debit Card News, vol. 3, No. 11, Nov. 28, 1997, (Author unknown), 3 pages.
News Release, For Release: Monday, Feb. 17, 1997, New 1-800-CALL-ATT campaign promotes one number for all calls, 2 pages.
S. P. Miller et al., Section E.2.1: Kerberos Authentication and Authorization System, Project Athena, Cambridge, Massachusetts, Dec. 21, 1987, 39 pages.
Swift Gift 'Wows' Internet Shoppers, Wed., Dec. 2, 1998, PR Newswire, 2 pages (Author Unknown).
ECARD, Frequently asked questions, printed Feb. 23, 2001, 7 pages.
Machilis, Computerworld, "Have it the 'smart' way: Burger King program drives smart-card use,", printed Feb. 23, 2001, 1 page.
Press Release, Mar. 5, 2004, Payment data systems files patent on debit card payment solution, American City Business Journals, 1 page.
Press releases '99, "Proton world and Europay to co-operate in creation of new CEPS-compliant E-purse application," printed Feb. 23, 2001, Waterloo, Belgium, Jun. 28, 1999, 2 pages.
SCIA (Smart Card Industry Association), About Smart Cards, "Electronic Purse," printed Feb. 23, 2001, www.scia.org, 1 page.
Cordis, PACE IST-1999-11531 PACE, "Purse application for cross border use in euro," printed Feb. 23, 2001, www.cordis.lu, 3 pages.
SK100 Smart Card Electronic Purse Balance Reader, printed Feb. 23, 2001, 1 page.
Press Release, Apr. 21, 1997, Smart card for loyalty and e-purse applications eclipses capability of conventional mag-stripe cards, printed Feb. 23, 2001, 3 pages, www.1.slb.com.
SmartAxis, Load cash on to your e-purse card, Supported Currencies and Schemes, printed Feb. 23, 2001, www.smartaxis.co.uk, 9 pages.
"The Electronic Purse Reaches the Car Park", printed Feb. 23, 2001, 2 pages.
Stuber, Bank of Canada, "The electronic purse: An overview of recent developments and issues," Technical Report No. 74, Jan. 1996, printed Feb. 23, 2001, www.bankofcanada.ca, 2 pages.
ICL, Understanding the benefits, "Smartcity offers a number of important benefits to both the card issuers and the customers," printed Feb. 27, 2001, www.icl.com, 2 pages.
Visa first to launch electronic purse load via GSM mobile phone, Johannesburg, Apr. 7, 1999, printed Feb. 23, 2001, www.cellular.co, 4 pages.
Hansell, New York Times, "Visa to unveil electronic purse cards," printed Feb. 23, 2001, 2 pages.
Machlis et al., "Will smart cards replace ATMs?," Computerworld, printed Feb. 23, 2001, 3 pages.

* cited by examiner

SYSTEM AND METHOD FOR PROVIDING PROMOTIONAL PRICING

FIELD OF THE INVENTION

The present invention relates generally to banking and financial services. More particularly, the present invention relates to a system and method for providing promotional pricing for credit accounts.

BACKGROUND OF THE INVENTION

A credit card is generally known as a payment card issued to a customer for purchasing goods and services or obtaining cash against a line of credit established by the issuer. It not only enables a customer to make cashless payment throughout the world, but also offers the financial flexibility to repay the credit extended either at once or on an installment basis. Apart from being a convenient financial instrument for the customers, credit cards or credit accounts also prove to be a powerful revenue-generating tool for the card-issuers. Routinely, a card-issuer can collect fees from merchants that honor the credit card in their transactions. The issuer can also collect finance charges from customers who carry unpaid balance in their accounts.

In recent years, card-issuers have been offering various types of promotional programs to attract new customers or to increase transaction activities among existing customers. For example, most banks promise a low introductory interest rate to new card members. Many offer low-interest-rate balance transfer opportunities by providing customers with balance transfer coupons or convenience checks. These promotional programs typically lower the annual percentage rate (APR) for a particular portion of a customer's account balance for a certain period of time, thereby encouraging the customer to spend more or borrow more against his or her available credit. As a result, the customer's account balance is typically subdivided into two or three parts, each being subjected to a different APR. For example, the account balance resulting from regular purchases may have a first APR of 9.99%, the balance resulting from cash advances may have a second APR of 19.99%, and the balance transferred from another card may have a third APR of 6.99% for 6 months. Here, the first and second APRs may have been specified in the card member agreement while the third APR may be a promotional rate valid for a limited time period.

A number of problems exist in traditional credit account management and promotional offering. For example, traditional credit accounts are usually limited to either a two-tier configuration (i.e., without any promotional APR) or a three-tier configuration (i.e., with only one promotional APR). Therefore, existing credit account systems typically lack the ability to offer multiple concurrent promotional APRs to a single account or to process transactions and payments based on multiple concurrent promotional APRs. This deficiency can significantly limit the card-issuer's ability to effectively promote a large array of products or services to each customer. Moreover, with the traditional two-tier or three-tier credit account configuration, there is a fixed payment arrangement specified in an initial card member agreement, which does not allow customer input on the payment allocation. Further, traditional credit account systems lack the ability to retroactively adjust payment allocation or re-calculate fees and charges.

Other problems and drawbacks also exist.

In view of the foregoing, it would be desirable to provide a solution for managing credit accounts and promoting credit sales which overcomes the above-described deficiencies and shortcomings.

SUMMARY OF THE INVENTION

One embodiment of the present invention comprises a method for providing promotional pricing. The method may comprise providing one or more pricing offers to a plurality of credit accounts, wherein at least one of said pricing offers is directed to a transaction selected from the group consisting of: a purchase of a specific product, a purchase of a product within a defined class of products, a purchase from a specific merchant, a purchase from a merchant within a defined class of merchants, a purchase in a specific date and time range, and a purchase in a specific amount range. The method may also comprise determining whether a transaction associated with a credit account qualifies for said one or more pricing offers based on at least one predetermined criterion. The method may further comprise assigning a balance incurred through a transaction to a promotional bucket associated with a particular pricing offer if said transaction qualifies for said particular pricing offer, or assigning said balance to a default bucket if said transaction does not qualify for said one or more pricing offers, thereby causing a total balance associated with said credit account to be distributed among said default bucket and one or more promotional buckets. The method may additionally comprise allocating payments associated with said credit account to said default bucket and said one or more promotional buckets according to a payment hierarchy.

Another embodiment of the present invention comprises a method for providing promotional pricing. The method comprises: providing one or more pricing offers to a plurality of credit accounts; determining whether a transaction associated with a credit account qualifies for said one or more pricing offers based on at least one predetermined criterion; assigning a balance incurred through said transaction to a promotional bucket associated with a particular pricing offer if said transaction qualifies for said particular pricing offer, or assigning said balance to a default bucket if said transaction does not qualify for said one or more pricing offers, thereby causing a total balance associated with said credit account to be distributed among said default bucket and one or more promotional buckets; applying fees and charges to said default bucket and said one or more promotional buckets based at least in part on said one or more pricing offers; and allocating payments associated with said credit account to said default bucket and said one or more promotional buckets according to a payment hierarchy, wherein said payment hierarchy is retroactively adjustable.

Yet another embodiment of the present invention comprises a system for providing promotional pricing. The system comprises: means for providing one or more pricing offers to a plurality of credit accounts, wherein at least one of said pricing offers is directed to a transaction selected from the group consisting of: a purchase of a specific product, a purchase of a product within a defined class of products, a purchase from a specific merchant, a purchase from a merchant within a defined class of merchants, a purchase in a specific date and time range, and a purchase in a specific amount range; means for determining whether a transaction associated with a credit account qualifies for said one or more pricing offers based on at least one predetermined criterion; means for assigning a balance incurred through a transaction to a promotional bucket associated with a particular pricing offer if said transaction qualifies for said particular pricing offer, or assigning said balance to a default bucket if said transaction does not qualify for said one or more pricing offers, thereby causing a total balance associated with said credit account to be distributed among said default bucket and one or more promotional buckets; and means for allocating payments associated with said credit account to said default bucket and said one or more promotional buckets according to a payment hierarchy.

Still another embodiment of the present invention comprises a system for providing promotional pricing. The system comprises: means for providing one or more pricing offers to a plurality of credit accounts; means for determining whether a transaction associated with a credit account qualifies for said one or more pricing offers based on at least one predetermined criterion; means for assigning a balance incurred through said transaction to a promotional bucket associated with a particular pricing offer if said transaction qualifies for said particular pricing offer, or assigning said balance to a default bucket if said transaction does not qualify for said one or more pricing offers, thereby causing a total balance associated with said credit account to be distributed among said default bucket and one or more promotional buckets; means for applying fees and charges to said default bucket and said one or more promotional buckets based at least in part on said one or more pricing offers; and means for allocating payments associated with said credit account to said default bucket and said one or more promotional buckets according to a payment hierarchy, wherein said payment hierarchy is retroactively adjustable.

One further embodiment of the present invention comprises a computer readable medium having code for causing at least one processor to provide promotional pricing. The computer readable medium comprises: code adapted to provide one or more pricing offers to a plurality of credit accounts, wherein at least one of said pricing offers is directed to a transaction selected from the group consisting of: a purchase of a specific product, a purchase of a product within a defined class of products, a purchase from a specific merchant, a purchase from a merchant within a defined class of merchants, a purchase in a specific date and time range, and a purchase in a specific amount range; code adapted to determine whether a transaction associated with a credit account qualifies for said one or more pricing offers based on at least one predetermined criterion; code adapted to assign a balance incurred through a transaction to a promotional bucket associated with a particular pricing offer if said transaction qualifies for said particular pricing offer, or to assign said balance to a default bucket if said transaction does not qualify for said one or more pricing offers, thereby causing a total balance associated with said credit account to be distributed among said default bucket and one or more promotional buckets; and code adapted to allocate payments associated with said credit account to said default bucket and said one or more promotional buckets according to a payment hierarchy.

One still further embodiment of the present invention comprises a computer readable medium having code for causing at least one processor to provide promotional pricing. The computer readable medium comprises: code adapted to provide one or more pricing offers to a plurality of credit accounts; code adapted to determine whether a transaction associated with a credit account qualifies for said one or more pricing offers based on at least one predetermined criterion; code adapted to assign a balance incurred through said transaction to a promotional bucket associated with a particular pricing offer if said transaction qualifies for said particular pricing offer, or assigning said balance to a default bucket if said transaction does not qualify for said one or more pricing offers, thereby causing a total balance associated with said credit account to be distributed among said default bucket and one or more promotional buckets; code adapted to apply fees and charges to said default bucket and said one or more promotional buckets based at least in part on said one or more pricing offers; and code adapted to allocate payments associated with said credit account to said default bucket and said one or more promotional buckets according to a payment hierarchy, wherein said payment hierarchy is retroactively adjustable.

Additional features and advantages of the invention will be set forth in the description that follows. The objects and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements.

DETAILED DESCRIPTION OF THE INVENTION

Reference will now be made in detail to the present embodiments of the invention, examples of which are illustrated in the accompanying drawings.

Figure 1:
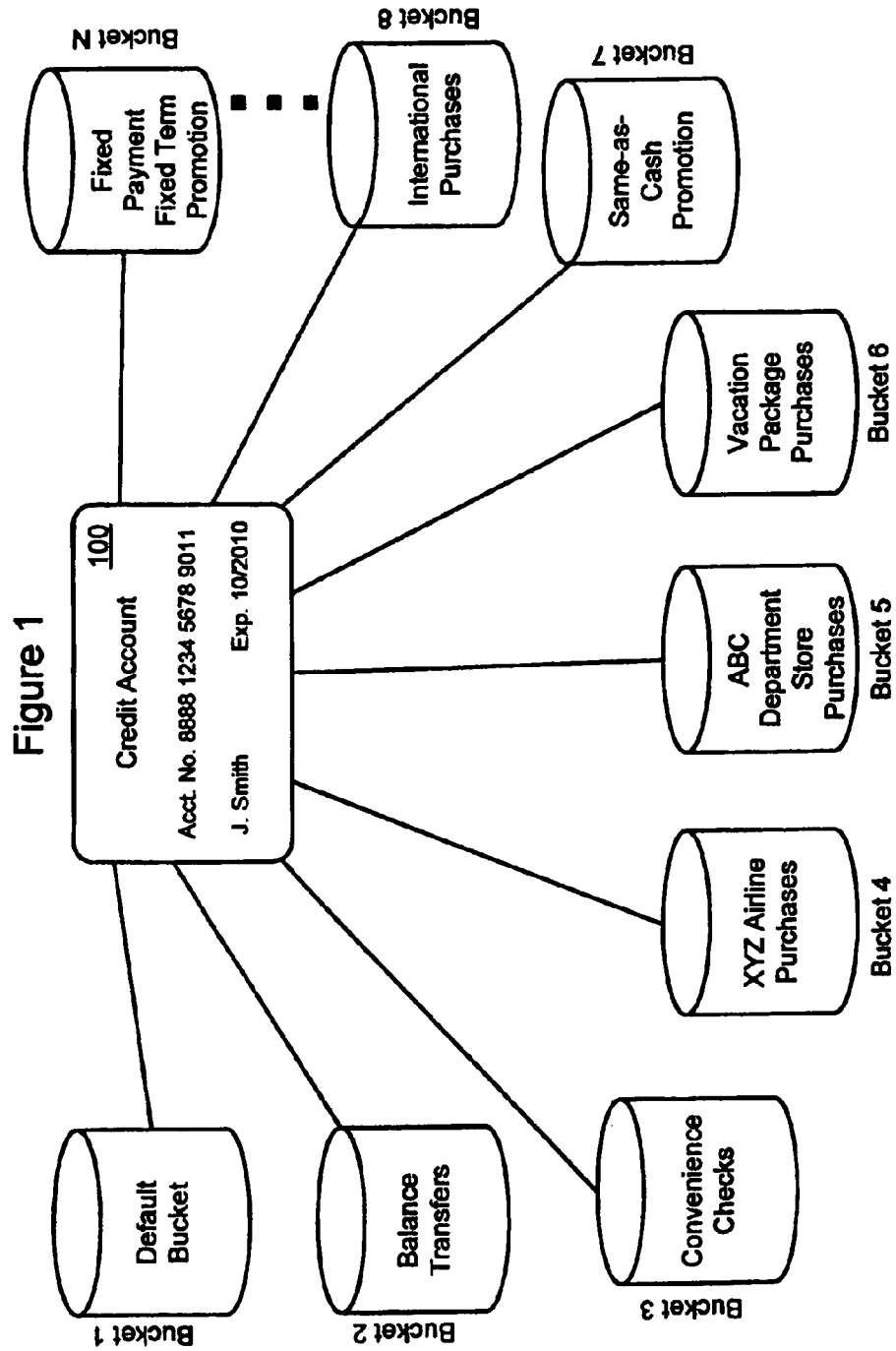
FIG. 1 is a block diagram illustrating an exemplary credit account for providing promotional pricing according to an embodiment of the present invention.

Referring to FIG. 1, there is shown a block diagram illustrating an exemplary credit account 100 for providing promotional pricing according to an embodiment of the present invention. The exemplary account 100 may comprise a number of buckets each of which may have a separate balance, APR, and other terms.

For example, Bucket 1 may be a "default bucket" or "contract bucket," which holds the balance resulting from regular (i.e., non-promotional) transactions. The APR(s) and all relevant terms applicable to Bucket 1 may be those specified in an initial card member agreement. It is also possible to have two separate default buckets, one for regular purchases and one for regular cash advances, for example.

Buckets 2 through N may be promotional buckets holding balances resulting from qualified transactions according to various promotional programs. For example, Bucket 2 may contain the balance transferred during a particular program period and may be subjected to a specific promotional APR. It is also possible to have additional balance transfer buckets for different promotional APRs. Bucket 3 may contain the balance resulting from convenience check transactions. Bucket 4 may contain the balance resulting from airfare purchases with XYZ Airline, where the XYZ Airline may be a business partner associated with the card-issuer. A lowered APR for Bucket 4 may promote ticket sales for the XYZ Airline. Further, balance and transactions associated with Bucket 4 may be linked with a mileage reward program. According to an embodiment of the present invention, different buckets may be associated with different reward programs. Bucket 5 may contain the balance resulting from general or specific purchases at ABC Department Store. The ABC Department Store may be another merchant affiliated with the card-issuer. A lower APR may apply to all purchases at the ABC Department Store for a certain period of time. Or a low or zero APR may apply to certain purchases (e.g., furniture and home appliances or other product of a particular manufacturer) for certain period of time. Bucket 6 may contain the balance from certain vacation package purchases, or another category of purchase regardless of merchant identity. Bucket 7 may be associated with same-as-cash promotions where the customer may accumulate interest-free balances for a few months and only start to pay finance charges if the same-as-cash balance is not paid off by end of the promotion period. Bucket 8 may be associated with foreign or international purchases, wherein balances and fees incurred in different foreign currencies may be accumulated. Special fees, value-added taxes and special exchange rates may be applied to the balance in Bucket 8. Bucket N may be associated with fixed-payment fixed-term promotions where the customer agrees to pay back a balance at a fixed installment amount over a fixed number of months.

As exemplified by the credit account 100, the multi-tiered multi-bucket account system may offer numerous possibilities for the card-issuer to offer promotional pricing. There can be an arbitrary number of buckets for each credit account, each bucket being associated with one or more promotional programs. The transactions and resulting balances may be categorized and assigned to different buckets based on transaction types (e.g., purchases, balance transfers or cash), merchant/product identities (e.g., UVW vacations, XYZ Airline tickets, or LMN books), or promotional programs (e.g., fixed-payment fixed-term programs or home improvement purchase programs). In general, a pricing offer may be directed to transactions such as a purchase of a specific product, a purchase of a product within a defined class of products, a purchase from a specific merchant, a purchase from a merchant within a defined class of merchants, a purchase in a specific date and time range, or a purchase in a specific amount range.

For each promotional bucket, there may be a set of criteria for determining which transactions are qualified so that the resulting balance can be assigned to this particular bucket. The qualification criteria may specify, for example, the transaction type(s), qualification period and amount restriction for the corresponding promotion program. Those transactions that do not qualify for any promotional bucket may be assigned to the default bucket(s). For each bucket, there may be a different set of terms regarding balance payback method, fees and charges, rewards amount, etc. When the customer makes a payment, it may be applied to the various buckets according to a payment hierarchy. The payment hierarchy may dictate the order in which the buckets receive payments and the amount each bucket receives. The payment hierarchy may be structured based on the card member agreement, promotional pricing offers, business rules and/or customer directions.

It should be appreciated that the various buckets may be created at different times. For example, when there is not any account balance, there may only be one or more default buckets. Or the default bucket(s) may be created only when a regular transaction has been posted to the account. As for promotional buckets, they may be created for a credit account around the time when the corresponding pricing offers are disclosed to the customer, i.e., at the beginning of the program period. Or a promotional bucket may be created only when a qualified transaction is posted to the account. According to embodiments of the invention, the various buckets may exist at substantially the same time, or during different time periods with or without overlaps.

Figure 2:
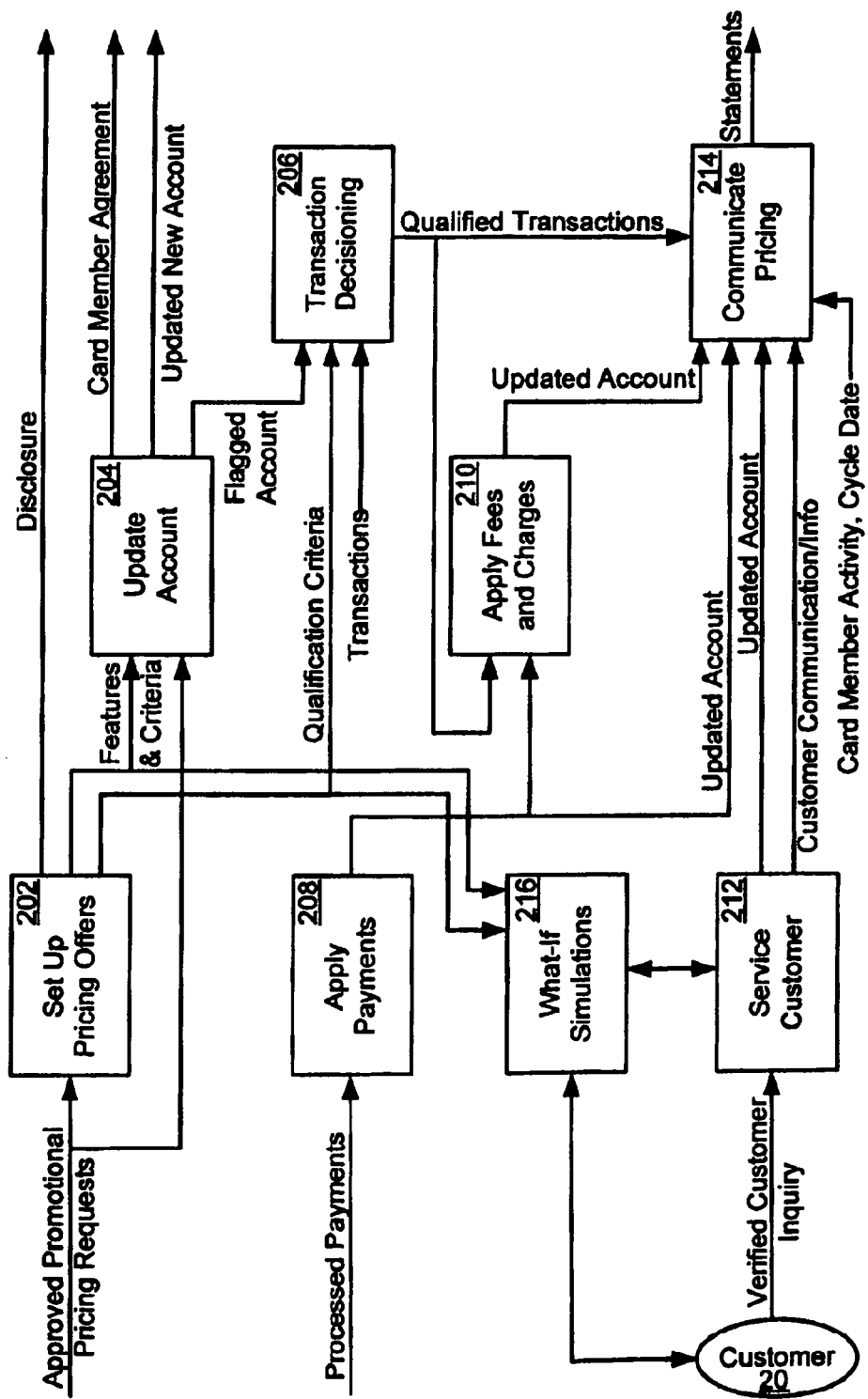
FIG. 2 is a flow chart illustrating an exemplary method for providing promotional pricing according to an embodiment of the present invention.

FIG. 2 is a flow chart illustrating an exemplary method for providing promotional pricing according to an embodiment of the present invention. This exemplary flow chart provides an overview of how a card-issuer may provide and manage the pricing offers. Some of the process steps are described in greater detail with reference to FIGS. 3-6.

In step 202, one or more uniquely identifiable promotional pricing offers may be created and set up. Based on approved promotional pricing requests, unique identifiers for the pricing offers may be created. All the pricing features including qualification criteria relevant to the pricing offers may be set up and recorded in an offer management database. Typical pricing features may include, without limitation: qualifying transaction type, promotional balance payback method, payment hierarchy placement, promotional pricing fee placement, qualifying transaction amount restrictions, and promotional pricing qualification period. Once the pricing offers are set up, the relevant terms and conditions may be created in preparation for disclosure to customers.

In step 204, the credit account data may be updated based on the new pricing offers. This step may apply to both prospective card members and existing customers. For example, prospective card members that qualify for the pricing offers may be selected. These qualified new customers may receive notification of offer availability via updated card member agreements or other types of communications. For existing customers that qualify for the pricing offers, their accounts may be flagged. For example, each credit account may be linked to one or more promotion identifiers ("Promo IDs") that the account qualifies for.

The flagged accounts may be referenced in step 206 for transaction decisioning. In this step, credit card transactions may be examined based on the qualification criteria. Upon qualification, each transaction may be assigned to its appropriate bucket. If a corresponding bucket does not exist, it may be created immediately in order for a qualified transaction to be properly assigned.

In step 208, processed payments may be applied to the credit accounts. For each account, the payment may be allocated to one or more buckets within the account based on a payment hierarchy. Upon payment allocation, the account data may be updated.

In step 210, fees and charges may be applied to each account based on its qualified transactions, payment information, and the updated account status, for example. Upon application of the fees and charges, the account data may be updated.

In step 212, the card-issuer may receive and service customer inquiries. The service may be provided at a telephone call center, on an Internet website, or via regular mail or electronic mail. A customer 20 may request detailed information regarding an ongoing pricing offer and demand inclusion therein. Or the customer 20 may be inquiring about a potential promotional pricing error on his or her account. Or the customer 20 may be requesting an adjustment to the payment hierarchy of his or her account. In the event of a potential pricing error, a customer service representative or an automated computer system may identify the error, provide a temporary solution to the customer, and create an issue report for correction of the pricing error. If the error is identified in the promotional pricing creation and setup process, such error may be elevated as a system-wide issue. For example, a software program may be utilized to provide a user interface for allowing a customer service representative or other employee to report system errors. If the customer requests an adjustment to the payment hierarchy, the adjustment may be applied retroactively. That is, one or more earlier payments may be re-allocated across the buckets in the customer's account. With this adjustment, any change in fees, charges and rewards may be re-calculated and the customer's account status may be updated accordingly. The issuer may apply a charge to the cardholder's account for executing the re-allocation. Further, the customer-preferred payment hierarchy may be recorded for application to later payments.

Apart from the ability to request or suggest payment re-allocation, a customer may also be able to move existing debt (i.e., balances) from one bucket to another. For example, through a web interface or the customer service call center, a customer may transfer balances from one or more buckets to a fixed-payment fixed-term bucket. Or the customer may merge the balances from several buckets into a single bucket. These processes are similar to balance transfers within the customer's credit account, which may simplify subsequent payment allocations.

In step 214, when the account cycle date is reached, the promotional pricing account information may be communicated to the customers via the monthly online or paper statements. The statements may report multiple APRs, that is, one or more different APRs for each promotional bucket. The statements may disclose specific account information for regulatory compliances. For example, a separate set of APRs, known as jurisdiction-specific APRs, may be calculated and disclosed based on the regulations of a particular state or other government entity, such as California regulations. Further, according to federal regulations such as the Truth In Lending Act, one or more effective APRs may be disclosed for each bucket to reflect true costs of a loan. One or more aggregated and/or effective APRs may also be disclosed for the credit account. Therefore, the statements may report to the customer multiple APRs which include, for example, one or more annual percentage rates associated with a particular bucket, one or more aggregated annual percentage rates associated with the credit account, one or more effective annual percentage rates associated with the credit account, and one or more jurisdiction-specific annual percentage rates associated with the credit account.

During statement generation, all the account information that has been updated due to various aspects (e.g., payment allocation, fees and charges and customer adjustment) of the promotional pricing offers may be incorporated into the statements. For example, for each non-fixed-payment fixed-term or non-same-as-cash promotional bucket, the statement may display its daily periodic rate, corresponding APR, previous and current cycle average daily balances, transaction fees, finance charges, and ending balance. For a fixed-payment fixed-term promotional bucket, the statement may display its outstanding principal balance, original transaction amount, monthly finance charge for billing period, fixed payment amount, expiration date, daily periodic rate, finance charge calculation method, and grace period explanation. If a retroactive adjustment has been made to a customer's account, one or more revised statements may be generated for the past months, or the adjustments may be reflected on current and future statements.

According to an embodiment of the present invention, the customer may also receive information associated with each transaction via electronic mail (E-mail), text messaging or other communication channels shortly after the transactional data are transmitted to the card issuer. The card issuer may have the customer's E-mail address on file. As soon as a purchase is posted to the customer's account, an E-mail message may be sent to inform the customer of the details of the transaction such as the transaction amount, date and time of transaction, merchant, product purchased. The customer may also be informed of pricing information associated with the transaction, such as its qualification for any promotional pricing offer, to which bucket the corresponding balance is assigned, the applicable APR, fees and rewards, etc. The customer may be offered one or more options to modify the current processing of the transaction. For example, the customer may choose to re-assign the balance to another bucket or to request a different payment method. The customer may parse the transaction summary information and load it into a financial management software application for each bookkeeping. Instead of E-mail notification for each transaction, similar notifications may be sent on a daily basis or weekly basis. Alternatively, these notifications may be loaded onto a web server and provided to the customer on a regular basis.

In step 216, a simulation function may be provided to simulate a payment-and-transaction stream for a customer's credit account. As retroactive changes are applied to the customer's account, the payment-and-transaction stream may keep track of the account transactions, balance movements, payments and payment allocations in a chronological order, thereby facilitating re-calculation of the APRs, fees, and rewards affected by the retroactive changes. The simulation function may be referred to as a "What-If" function since the customer or the customer service representatives may utilize this function to find out what happens if certain adjustments are made to the customer's account. That is, the balance assignment and/or payment allocation may be hypothetically adjusted and the resulting account status (e.g., balance, fees and charges) may be shown interactively. By trying different payment-and-transaction stream variations, a desired adjustment to the account may be determined and then executed. In addition, a rewards amount affected by the adjustment may be re-calculated. The simulation may also allow a customer to vary immediate and future payment amounts to observe their impact on the bucket balances, APRs, and reward points.

Figure 3:
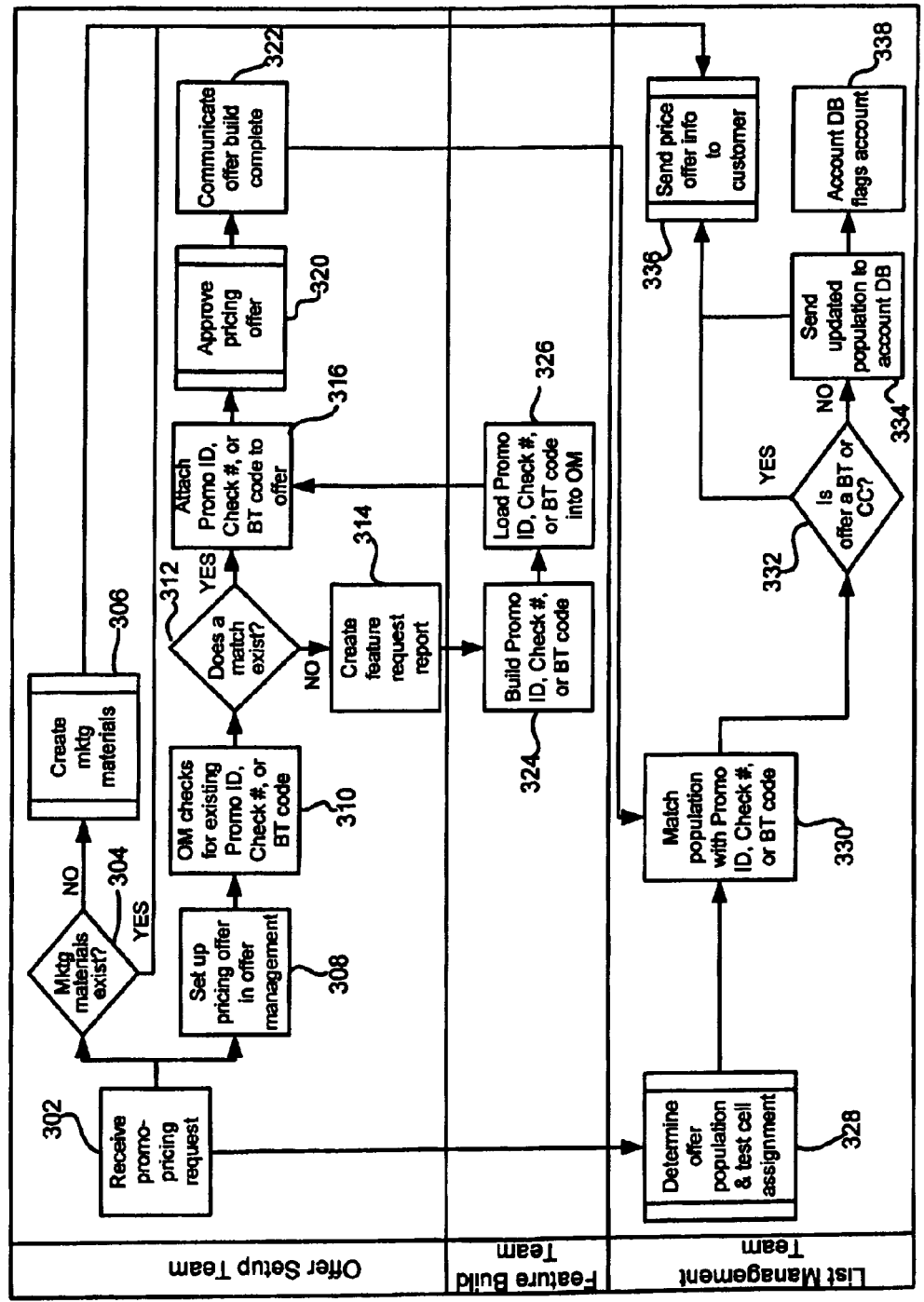
FIG. 3 is a flow chart illustrating an exemplary process for setting up pricing offers and updating credit accounts according to an embodiment of the present invention.

Referring to FIG. 3, there is shown a flow chart illustrating an exemplary process for setting up pricing offers and updating credit accounts according to an embodiment of the present invention. This process may be an exemplary implementation of the steps 202 and 204 shown in FIG. 2. The process may involve an offer setup team, a feature build team and a list management team.

In step 302, the offer setup team may receive a promotional pricing request. In step 304, the offer setup team may check whether any marketing materials related to the requested pricing offer exist. The marketing materials may include, for example, any content describing the pricing features of the pricing offer and disclosure of terms and conditions as required for legal compliance. If such materials do not exist, they may be created in step 306. The pre-existing or newly created marketing materials may then be sent to the customers in step 336.

In step 308, the offer setup team may set up the requested pricing offer in an offer management database. Then, in step 310, the offer management database may check existing Promo IDs, convenience check numbers or balance transfer codes. It may be determined, in step 312, whether any existing promotional pricing offer matches the requested pricing offer. If a match exists, an existing identifier may be noted for the matching pricing offer, and the process may branch to step 316. If a match does not exist, a feature request report may be created in step 314 for submission to the feature build team. Upon receiving the feature request report, the feature build team may, in step 324, build a new unique identifier (e.g., a Promo ID, convenience check number, or balance transfer code) for the requested pricing offer. The new identifier may be loaded into the offer management database in step 326.

In step 316, the new or existing identifier may be attached to the new pricing offer. The new pricing offer may then be approved in step 320. And the "offer build complete" message may be communicated to the list management team in step 322.

In step 328, the list management team may determine what customer population the new pricing offer applies to and may create marketing offers containing both control and test populations split appropriately for back-end analysis. In step 330, upon receiving the "offer build complete" message, the list management team may pull the new pricing offer identifier from the offer management database and match it to qualified customer population. Then, in step 332, it may be determined whether the new pricing offer is a balance transfer or convenience check promotion. Either way the pricing offer information may be sent to the customers in step 336. If the new pricing offer is not for balance transfers or convenience checks, the updated population may be sent to the account database in step 334. In step 338, the qualified accounts may be flagged based on the updated population.

Figure 4:
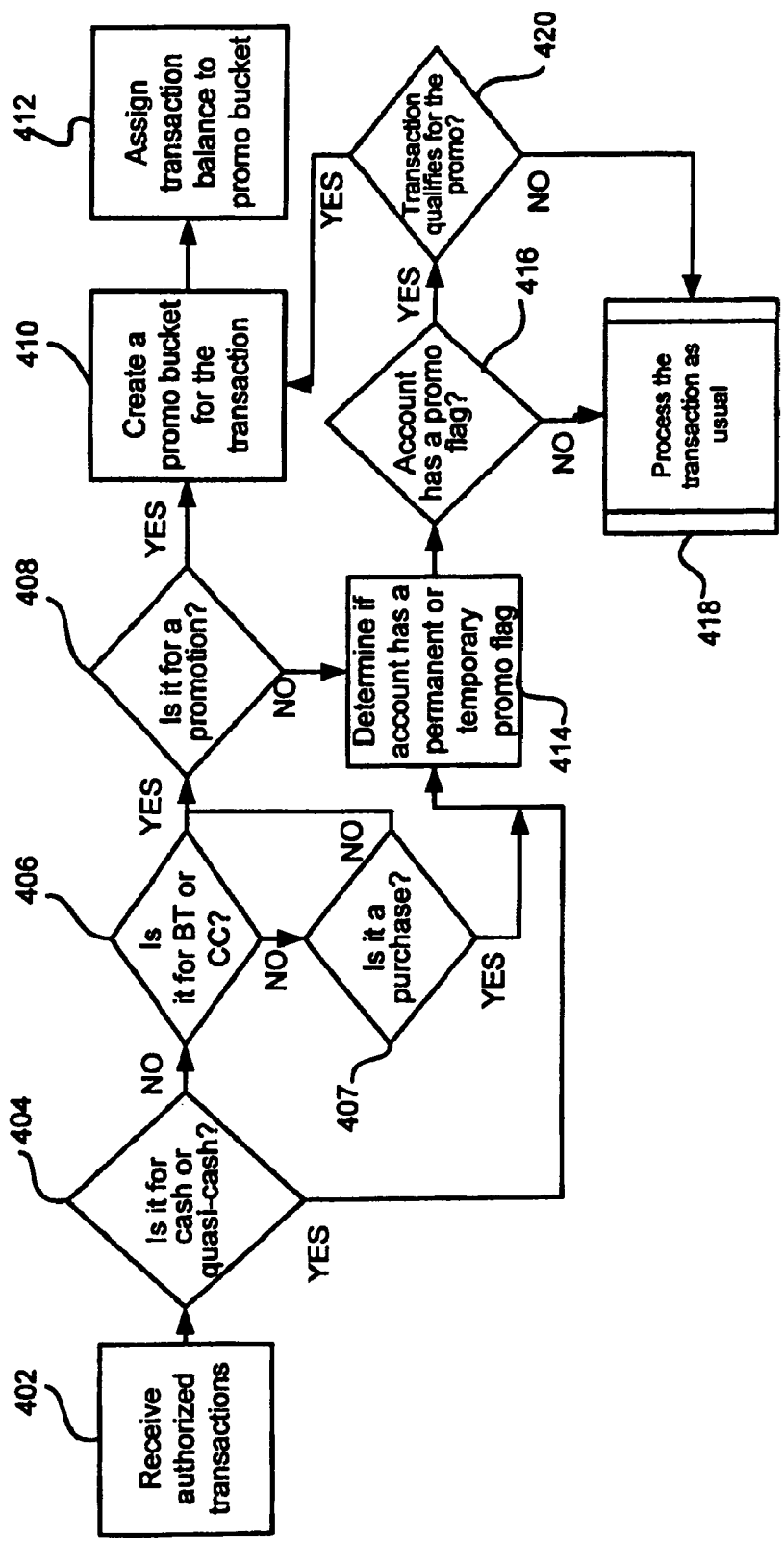
FIG. 4 is a flow chart illustrating an exemplary process for qualifying transactions according to an embodiment of the present invention.

FIG. 4 is a flow chart illustrating an exemplary process for qualifying transactions according to an embodiment of the present invention. This process may be an exemplary implementation of step 206 shown in FIG. 2. The exemplary process starts in step 402 where data associated with authorized transactions may be received. In step 404, it may be determined whether a transaction is a cash or quasi-cash transaction. If so, the process may branch to step 414. Otherwise, it may be determined in step 406 whether the transaction is a balance transfer or convenience check transaction. If the transaction is not a balance transfer or convenience check transaction, the process may branch to step 407. Otherwise, the process may branch to step 408. In step 407, it may be determined whether the transaction is a purchase. If the transaction is a purchase, the process may branch to step 414. Otherwise, it may be determined in step 408 whether the transaction is for a particular promotion. If the transaction is for a particular promotion, the process may branch to step 410. If not, it may be determined in step 414 whether the corresponding credit account has a permanent or temporary promotional flag. If it is determined in step 416 that the account is not flagged for any promotion, then the transaction may be processed as regular non-promotional transaction in step 418. If the account is flagged, then it may be determined in step 420 whether the transaction qualifies for the promotion. If the transaction does not qualify, it may be processed as a regular transaction in step 418. If it does qualify, a promotional bucket may be created for the transaction in step 410.

Then, in step 412, the balance resulting from the transaction may be assigned to the promotional bucket.

Figure 5:
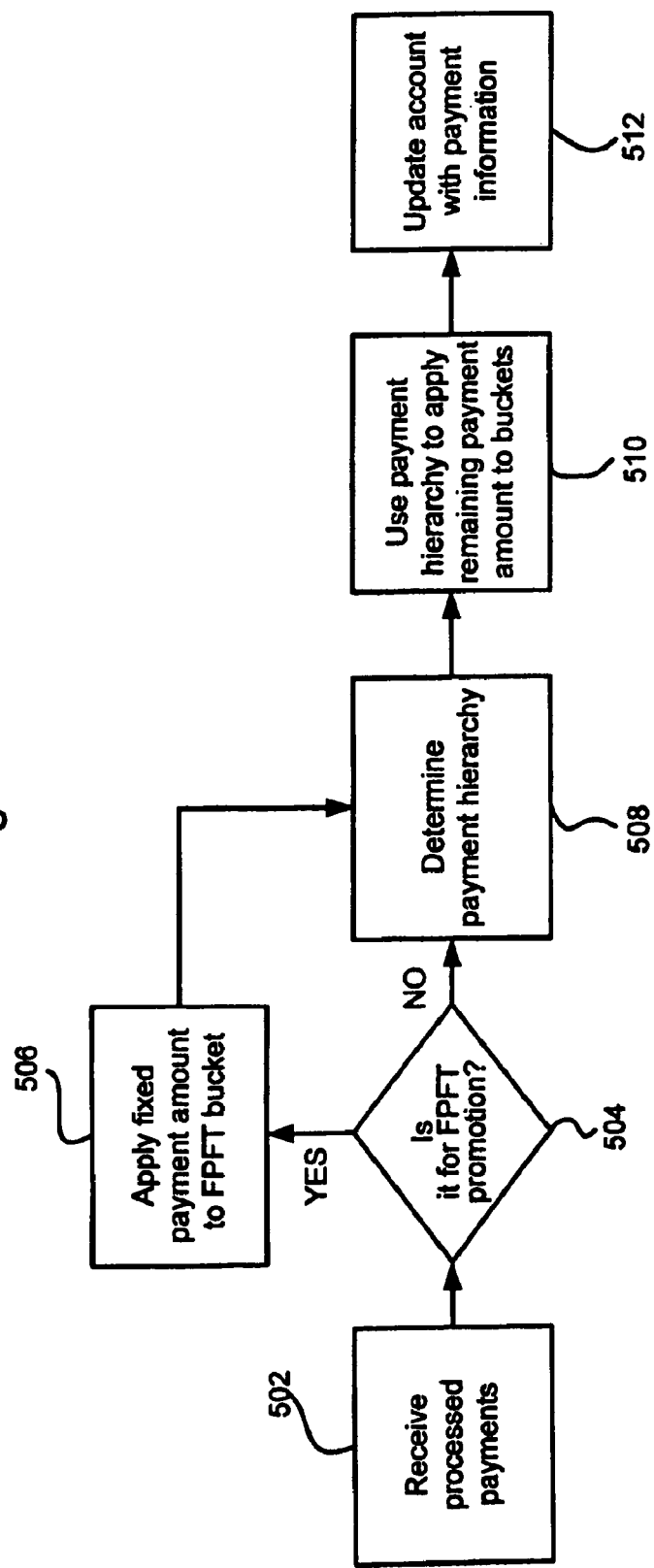
FIG. 5 is a flow chart illustrating an exemplary process for applying payments according to an embodiment of the present invention.

FIG. 5 is a flow chart illustrating an exemplary process for applying payments according to an embodiment of the present invention. This process may be an exemplary implementation of step 208 shown in FIG. 2. In step 502, processed customer payments may be received. It may be determined in step 504 whether a payment is for a fixed-payment fixed-term promotion. If so, a fixed payment amount may be applied to the fixed-payment fixed-term bucket and the process may branch to step 508 if there is still payment left. If the payment is not for any fixed-payment fixed-term promotion, a payment hierarchy may be determined in step 508. Based on the payment hierarchy, in step 510 the remaining payment may be applied to the remaining buckets in the customer's account. Then, in step 512, the account may be updated with the payment information.

Figure 6:
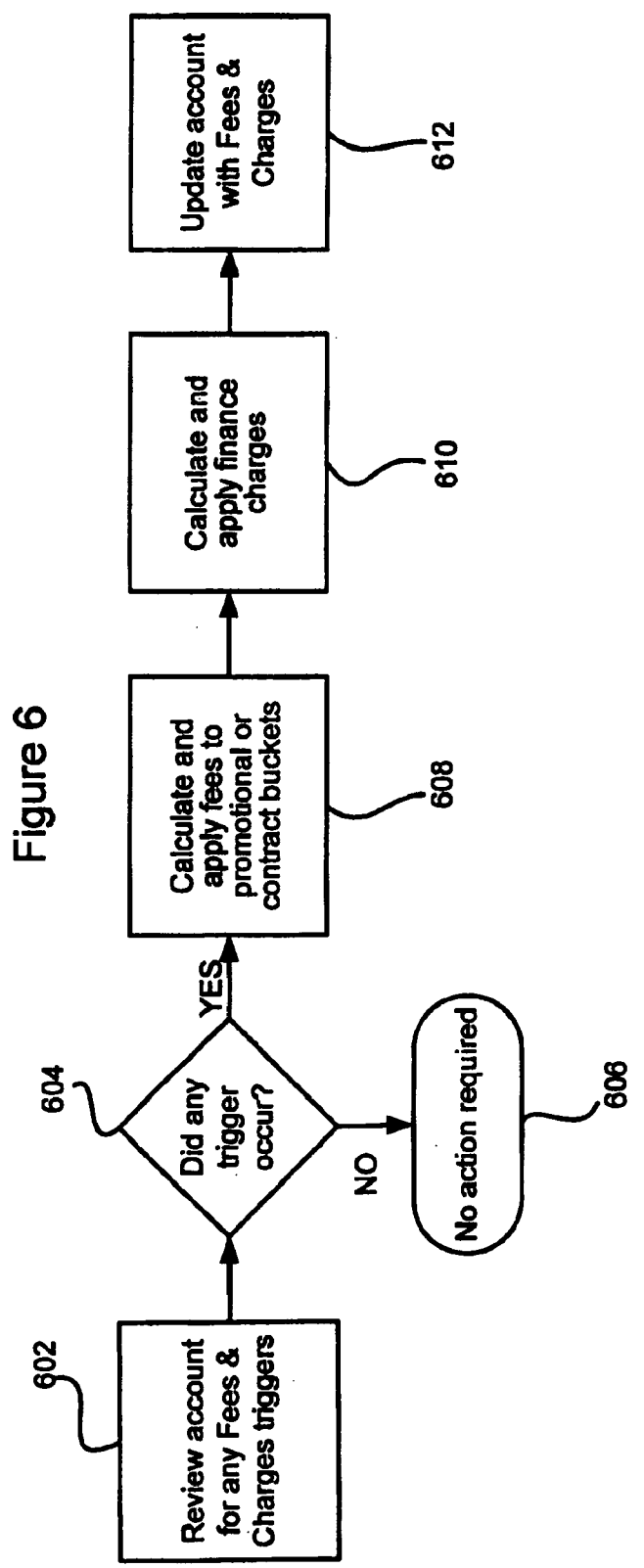
FIG. 6 is a flow chart illustrating an exemplary process for applying fees and charges according to an embodiment of the present invention.

FIG. 6 is a flow chart illustrating an exemplary process for applying fees and charges according to an embodiment of the present invention. This process may be an exemplary implementation of step 210 shown in FIG. 2. In step 602, a credit account may be reviewed for any fees and charges triggers. Fees and charges triggers may include any account activities that lead to transaction fees and finance charges. For example, a balance transfer may incur a minimum fee. A same-as-cash bucket not paid off at expiration of the same-as-cash promotion period may cause a finance charge. If it is determined in step 604 that no trigger occurred, no action is required in step 606. If one or more triggers did occur, then certain fees may be applied in step 608 and certain finance charges may be applied in step 610. In step 612, the account may be updated based on the fees and charges.

Figure 7:
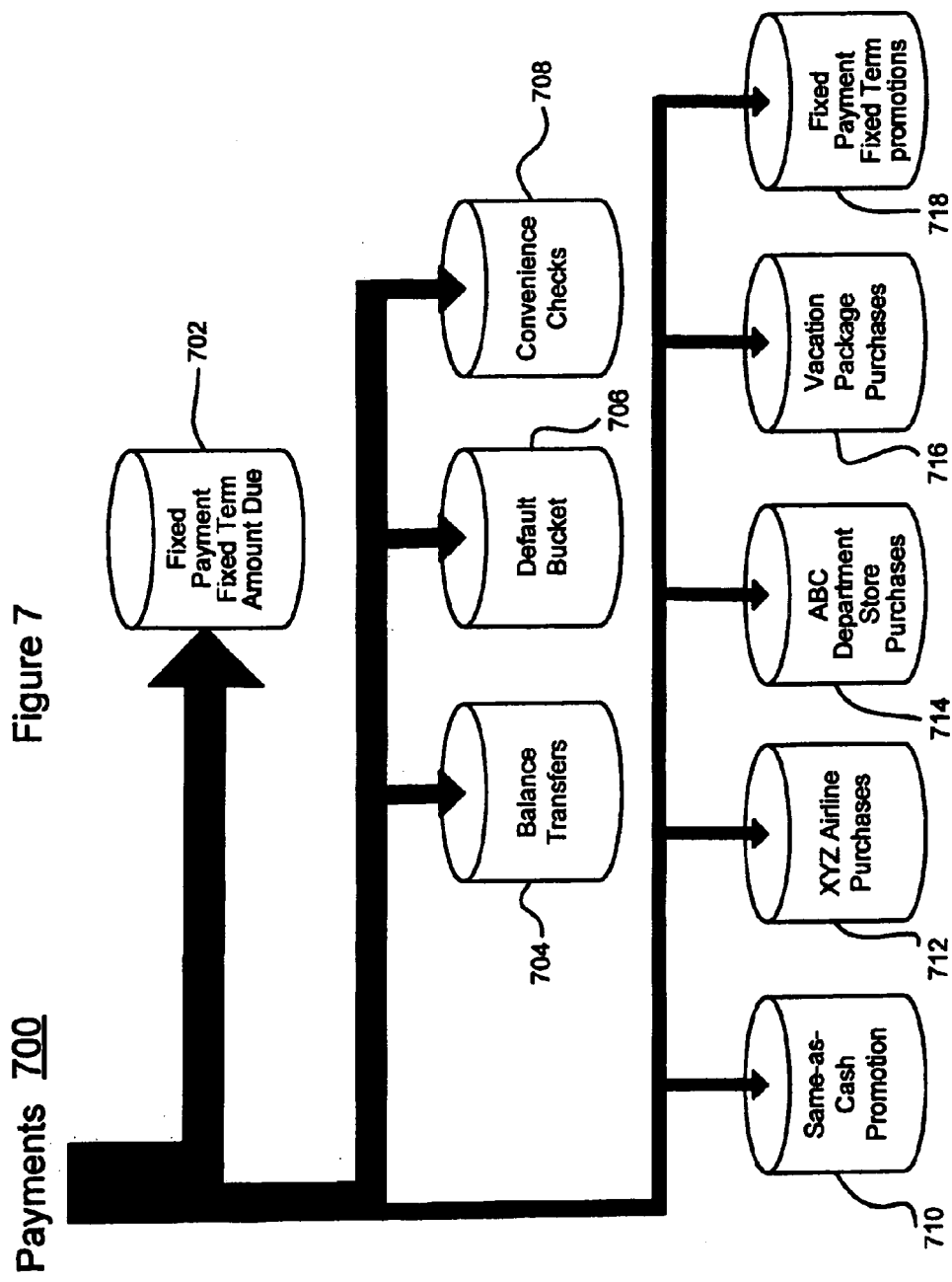
FIG. 7 is a block diagram illustrating an exemplary payment hierarchy according to an embodiment of the present invention.

FIG. 7 is a block diagram illustrating an exemplary payment hierarchy according to an embodiment of the present invention. With multiple buckets carrying separate balances in a single credit account, it may be desirable to have a well-defined yet flexible payment hierarchy. When a customer makes one or more payments, the payment hierarchy may specify not only a priority order for the various buckets to receive payments but also a payment allocation scheme among the buckets.

The payment hierarchy may be contingent upon the amount of payment as well as the number and type of balance-carrying buckets. Basic rules or guidelines for the payment hierarchy may be predetermined based on the card member agreement, card-issuer's business rules, or customer preference. For example, a set of default rules for payments allocation may be initially established in the card member agreement. Certain business rules may be set up to maximize the card-issuer's profits. One exemplary business rule may be to apply payments to buckets with zero or low APRs first before the payments are applied to higher-APR buckets. Another exemplary rule may be to give certain un-expired promotional buckets the lowest priority in payment allocation, so that the customer may fully enjoy the promotion benefits. The payment hierarchy may also be adjusted based on customer inputs. That is, the customer may contact the card-issuer to propose a preferred payment hierarchy different from an existing configuration. The adjusted payment hierarchy may then be applied retroactively to past payment(s) as well as future payments. For example, for same-as-cash transactions with deferred interest applicable if the corresponding balance is not paid in full by the expiration date of the promotion, a payment may be retroactively applied based on an adjusted payment hierarchy.

In the exemplary payment hierarchy shown in FIG. 7, the fixed-payment fixed-term promotion bucket 702 has the highest priority in receiving payment. Whenever payments 700 are received, a fixed amount may be allocated to the fixed-payment fixed-term amount due bucket 702 since the customer has agreed to pay this fixed amount. If there is any remaining amount, it is applied to the buckets with a second priority. The second-priority buckets may include a balance transfers bucket 704, a default bucket 706 and a convenience checks bucket 708, for example. These second-priority buckets may be associated with expired promotional programs and may contain balances that are accumulating finance charges at a faster rate than other buckets. If there is any payment left after the second-priority buckets are paid off, the remaining buckets may receive the leftover payment. These lower priority buckets may have lower interest rates than those higher priority buckets. In this example, the lower priority buckets may include a same-as-cash promotion bucket 710, an XYZ Airline purchases bucket 712, an ABC Department Store purchases bucket 714, a vacation package purchases 716, and a fixed-payment fixed-term promotions bucket 718. The bucket 718 may contain the remaining fixed-payment fixed-term balance that is not immediately due.

For a better understanding of the payment re-allocation process, an exemplary scenario is described below. A card member may have taken advantage of a same-as-cash promotion (e.g., with 0% APR for 6 months with deferred interest if the corresponding balance is not paid in full by the expiration date). When the promotion expires, finance charges may be assessed for the unpaid balance, or all the deferred finance charges may be assessed. The card member may call customer service of the card issuer and request that the most recent payment be applied to the same-as-cash promotion instead of the other buckets to which the payment has already be applied. A customer service representative may cause the system to waive the finance charges assessed on the same-as-cash balance and re-allocate the payment to the same-as-cash bucket. A rule may be imposed to require this payment re-allocation be done within 30 days of the assessment of the finance charges.

The method for providing promotional pricing in accordance with the present invention may be typically implemented in a computer-based system. The computer-based system may comprise one or more processors and/or computers capable of data manipulation, logic operation and mathematical calculation. The system may further comprise one or more databases for storing and managing promotional pricing offer data, credit account data, and credit transaction data, for example. In addition, a number of user interfaces may be provided for the card-issuer's personnel to set up pricing offers and to service customers. The system may be implemented on computers or computer networks.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

What is claimed is:

1. A method for providing promotional pricing, the method comprising:

providing one or more pricing offers to one or more customers who have one or more credit accounts, wherein at least one of said pricing offers is directed to a transaction comprising one or more of the following:

a purchase of a specific product,
a purchase of any product within a defined class of products,
a purchase from a specific merchant,
a purchase from any merchant within a defined class of merchants,
a purchase in a specific date and time range, and
a purchase in a specific amount range;

determining whether the transaction associated with at least one credit account of a customer qualifies for said at least one of said pricing offers based on at least one predetermined criterion;

assigning a balance incurred through the transaction to a promotional bucket associated with said at least one of said pricing offers if said transaction qualifies for said at least one of said pricing offers, or assigning said balance incurred to a default bucket if said transaction does not qualify for (a) said at least one of said pricing offers or (b) any one of the one or more pricing offers, thereby causing a total balance associated with the at least one credit account to be distributed among said default bucket and one or more promotional buckets;

allocating payments associated with the at least one credit account to said default bucket and said one or more promotional buckets according to a predetermined payment hierarchy wherein the predetermined payment hierarchy determines the allocation of payments amongst the default bucket and the one or more promotional buckets;

retroactively adjusting said predetermined payment hierarchy causing at least one past payment to be re-allocated among said default bucket and said one or more promotional buckets based at least in part on one or more preferences associated with the customer; and updating the at least one credit account based on said retroactively adjusted payment hierarchy.

2. The method according to claim 1, wherein each of said one or more pricing offers is defined by at least one pricing feature comprising one or more of the following:

an annual percentage rate;
a transaction fee;
a finance charge;
a balance payback method;
a payment hierarchy placement;
a transaction amount restriction;
a qualifying transaction type; and
a qualification period.

3. The method according to claim 1, wherein said one or more pricing offers are associated with transaction types comprising one or more of the following:

general purchases;
specific purchases;
balance transfers;
convenience check transactions;
cash transactions;
quasi-cash transactions;
existing debt; and
foreign purchases.

4. The method according to claim 1, further comprising:

making one or more hypothetical adjustments to the at least one credit account based on said one or more preferences associated with the customer wherein the one or more hypothetical adjustments comprise one or more adjustments in said predetermined payment hierarchy altering a payment allocation and a balance distribution among said default bucket and said one or more promotional buckets; and displaying an impact of the one or more hypothetical adjustments on the at least one credit account involving said altering of said payment allocation and said balance distribution among said default bucket and said one or more promotional buckets.

5. The method according to claim 4 further comprising:
determining a status of said at least one credit account based on said one or more hypothetical adjustments.

6. The method according to claim 1, wherein the step of updating the at least one credit account further comprises re-calculating, for at least one of said default bucket and said one or more promotional buckets, pricing information comprising one or more of the following:
an annual percentage rate;
an effective annual percentage rate;
a jurisdiction-specific annual percentage rate;
a transactional fee;
a finance charge; and
a rewards amount.

7. The method according to claim 1 further comprising:
communicating to the customer pricing information related to the transaction via electronic means; and
providing said customer an option to modify said pricing information.

8. The method according to claim 7, wherein said pricing information comprises one or more of the following:
an annual percentage rate, a transaction fee, and a rewards amount and
wherein the electronic means comprises at least electronic alerts.

9. The method according to claim 1 further comprising:
tracking a stream of payments and transactions associated with the at least one credit account based on a history of the at least one credit account and one or more retroactive payment hierarchy adjustments applied to said history; and
determining pricing information for said default bucket and said one or more promotional buckets of the at least one credit account corresponding to said stream of payments and transactions and said one or more retroactive payment hierarchy adjustments, wherein said pricing information comprises an annual percentage rate.

10. The method according to claim 1 further comprising communicating to the customer at least one piece of pricing information comprising one or more of the following:
one or more annual percentage rates associated with either said one or more promotional buckets or said default bucket;
one or more effective annual percentage rates associated with said one or more promotional buckets or said default bucket;
one or more aggregated annual percentage rates associated with the at least one credit account;
one or more effective annual percentage rates associated with the at least one credit account; and
one or more jurisdiction-specific annual percentage rates associated with said the at least one credit account.

11. The method according to claim 1 further comprising:
reporting a first annual percentage rate calculated according to a first standard and a second annual percentage rate calculated according to a second standard, the second standard being derived from a government regulation.

12. The method according to claim 1 further comprising:
transferring at least part of a balance associated with one bucket to another bucket wherein said one bucket comprises any one of the one or more promotional buckets or the default bucket and said another bucket comprises the default bucket or any one of the one or more promotional buckets.

13. The method according to claim 1 further comprising:
adjusting fees and charges for said default bucket and said one or more promotional buckets retroactively.

14. The method according to claim 1, wherein at least one pricing offer of said one or more pricing offers is associated with a rewards program.

15. The method according to claim 1, wherein said adjusted payment hierarchy is determined based on one or more business rules.

16. A method for providing promotional pricing, the method comprising:
providing one or more pricing offers to one or more customers who have one or more credit accounts;
determining whether a transaction associated with at least one credit account of a customer credit account qualifies for said one or more pricing offers based on at least one predetermined criterion;
assigning a balance incurred through said transaction to a promotional bucket associated with said one or more pricing offers if said transaction qualifies for said one or more pricing offers, or assigning said balance incurred to a default bucket if said transaction does not qualify for said one or more pricing offers, thereby causing a total balance associated with said credit account to be distributed among said default bucket and one or more promotional buckets;
applying fees and charges to said default bucket and said one or more promotional buckets based at least in part on said one or more pricing offers; and
allocating payments associated with the at least one credit account to said default bucket and said one or more promotional buckets according to a predetermined payment hierarchy wherein (a) the predetermined payment hierarchy determines the allocation of payments amongst the default bucket and the one or more promotional buckets and (b) said predetermined payment hierarchy is retroactively adjustable to cause at least one past payment to be re-allocated among said default bucket and said one or more promotional buckets based at least in part on one or more preferences associated with the customer.

17. The method according to claim 16, wherein said predetermined payment hierarchy is adjustable based on one or more business rules.

18. The method according to claim 16 further comprising:
communicating, to the customer, pricing information related to the transaction via electronic means, wherein said pricing information comprises an annual percentage rate and wherein the electronic means comprises at least electronic alerts; and
providing said customer an option to modify said pricing information.

19. The method according to claim 16 further comprising:
tracking a stream of payments and transactions associated with said the at least one credit account based on a history of said the at least one credit account and one or more retroactive payment hierarchy adjustments applied to said history; and
determining pricing information for said default bucket and said one or more promotional buckets of said the at least one credit account corresponding to said stream of payments and transactions and said one or more retroactive payment hierarchy adjustments.

20. The method according to claim 19, wherein the pricing information comprises an annual percentage rate, a transaction fee, and a rewards amount.

21. A method for providing promotional pricing, the method comprising:
   providing one or more pricing offers to one or more customers who have one or more credit accounts, wherein at least one of said pricing offers is directed to a transaction comprising one or more of the following:
      a purchase of a specific product,
      a purchase of any product within a defined class of products,
      a purchase from a specific merchant,
      a purchase from any merchant within a defined class of merchants,
      a purchase in a specific date and time range, and
      a purchase in a specific amount range;
   determining whether the transaction associated with at least one credit account of a customer qualifies for said at least one of said pricing offers based on at least one predetermined criterion;
   assigning a balance incurred through the transaction to a promotional bucket associated with said at least one of said pricing offers if said transaction qualifies for said at least one of said pricing offers, or assigning said balance incurred to a default bucket if said transaction does not qualify for (a) said at least one of said pricing offers or (b) any one of the one or more pricing offers, thereby causing a total balance associated with the at least one credit account to be distributed among said default bucket and one or more promotional buckets;
   allocating payments associated with the at least one credit account to said default bucket and said one or more promotional buckets according to a predetermined payment hierarchy wherein the predetermined payment hierarchy determines the allocation of payments amongst the default bucket and the one or more promotional buckets;
   retroactively adjusting said payment allocation among said default bucket and said one or more promotional buckets thereby causing at least one past payment to be re-allocated among said default bucket and said one or more promotional buckets; and
   re-calculating, for said at least one credit account, pricing information comprising one or more of the following:
      an annual percentage rate;
      an effective annual percentage rate;
      a jurisdiction-specific annual percentage rate;
      a transactional fee;
      a finance charge; and
      a rewards amount.

22. The method according to claim 21, wherein said predetermined payment hierarchy is adjusted based on customer preferences.

23. A system for providing promotional pricing, the system comprising:
   a memory and a computer processor with said computer processor operable to:
   provide one or more pricing offers to one or more customers who have one or more credit accounts, wherein at least one of said pricing offers is directed to a transaction comprising one or more of the following:
      a purchase of a specific product,
      a purchase of any product within a defined class of products,
      a purchase from a specific merchant,
      a purchase from any merchant within a defined class of merchants,
      a purchase in a specific date and time range, and
      a purchase in a specific amount range;
   determine whether the transaction associated with at least one credit account of a customer qualifies for said at least one of said pricing offers based on at least one predetermined criterion;
   assign a balance incurred through the transaction to a promotional bucket associated with said at least one of said pricing offers if said transaction qualifies for said at least one of said pricing offers, or assigning said balance incurred to a default bucket if said transaction does not qualify for (a) said at least one of said pricing offers or (b) any one of the one or more pricing offers, thereby causing a total balance associated with the at least one credit account to be distributed among said default bucket and one or more promotional buckets; and
   allocate payments associated with the at least one credit account to said default bucket and said one or more promotional buckets according to a predetermined payment hierarchy wherein the predetermined payment hierarchy determines the allocation of payments amongst the default bucket and the one or more promotional buckets;
   retroactively adjust said predetermined payment hierarchy thereby causing at least one past payment to be re-allocated among said default bucket and said one or more promotional buckets based at least in part on one or more preferences associated with the customer; and
   update the at least one credit account based on said retroactively adjusted payment hierarchy.

24. The system according to claim 23 with said processor further operable to:
   simulate one or more hypothetical adjustments to the at least one credit account based at least in part on said one or more preferences associated with the customer; and
   display an impact of the one or more hypothetical adjustments on the at least one credit account involving altering a payment allocation and a balance distribution among said default bucket and said one or more promotional buckets.

25. The system according to claim 24 with said processor further operable to:
   determine a status of the at least one credit account based on said one or more hypothetical adjustments.

26. The system according to claim 23, wherein said computer processor operability to update the at least one credit account further comprises computer processor operability to re-calculate, for at least one of said default bucket and said one or more promotional buckets, pricing information comprising one or more of the following:
   an annual percentage rate;
   an effective annual percentage rate;
   a jurisdiction-specific annual percentage rate;
   a transactional fee;
   a finance charge; and
   a rewards amount.

27. The system according to claim 23 with said processor further operable to:
   communicate to the customer at least one piece of pricing information comprising one or more of the following:
      one or more annual percentage rates associated with either said one or more promotional buckets or said default bucket;

one or more effective annual percentage rates associated with either said one or more promotional buckets or said default bucket;

one or more aggregated annual percentage rates associated with said the at least one credit account;

one or more effective annual percentage rates associated with said the at least one credit account; and one or more jurisdiction-specific annual percentage rates associated with said the at least one credit account.

28. The system according to claim 23 with said processor further operable to:

transfer at least part of a balance associated with one bucket to another bucket wherein said one bucket may comprise any one of the one or more promotional buckets or the default bucket and said another bucket may comprise the default bucket or the any one of the one or more promotional buckets.

29. A system for providing promotional pricing, the system comprising:

a memory and a computer processor with said computer processor operable to:

provide one or more pricing offers to one or more customers who have one or more credit accounts;

determine whether a transaction associated with at least one credit account of a customer qualifies for said one or more pricing offers based on at least one predetermined criterion;

assign a balance incurred through said transaction to a promotional bucket associated with one or more pricing offers if said transaction qualifies for said one or more pricing offers, or assigning said balance to a default bucket if said transaction does not qualify for said one or more pricing offers, thereby causing a total balance associated with the at least one credit account to be distributed among said default bucket and one or more promotional buckets;

apply fees and charges to said default bucket and said one or more promotional buckets based at least in part on said one or more pricing offers; and allocate payments associated with said the at least one credit account to said default bucket and said one or more promotional buckets according to a predetermined payment hierarchy wherein (a) the predetermined payment hierarchy determines the allocation of payments amongst the default bucket and the one or more promotional buckets, and (b) wherein said predetermined payment hierarchy is retroactively adjustable to cause at least one past payment to be re-allocated among said default bucket and said one or more promotional buckets based at least in part on one or more preferences associated with the customer.

30. The system according to claim 29 with said processor further operable to:

communicate, to the customer, pricing information related to the transaction via electronic means, wherein said pricing information comprises an annual percentage rate and wherein the electronic means comprises at least alerts; and provide said customer an option to modify said pricing information.

31. A computer readable medium having code for causing a processor to provide promotional pricing, the computer readable medium comprising:

code adapted to provide one or more pricing offers to one or more customers who have one or more credit accounts, wherein at least one of said pricing offers is directed to a transaction comprising one or more of the following:

a purchase of a specific product, a purchase of any product within a defined class of products, a purchase from a specific merchant, a purchase from any merchant within a defined class of merchants, a purchase in a specific date and time range, and a purchase in a specific amount range;

code adapted to determine whether the transaction associated with at least one credit account of a customer qualifies for said at least one of said pricing offers based on at least one predetermined criterion;

code adapted to assign a balance incurred through the transaction to a promotional bucket associated with the at least one of said pricing offers if said transaction qualifies for said at least one of said pricing offers, or to assign said balance to a default bucket if said transaction does not qualify for (a) said at least one of said pricing offers or (b) any one of the one or more pricing offers, thereby causing a total balance associated with said at least one credit account to be distributed among said default bucket and one or more promotional buckets; and code adapted to allocate payments associated with the at least one credit account to said default bucket and said one or more promotional buckets according to a predetermined payment hierarchy wherein the predetermined payment hierarchy determines the allocation of payments amongst the default bucket and the one or more promotional buckets;

code adapted to retroactively adjust said predetermined payment hierarchy thereby causing at least one past payment to be re-allocated among said default bucket and said one or more promotional buckets based at least in part on one or more preferences associated with the customer; and code adapted to update the at least one credit account based on said retroactively adjusted payment hierarchy.

32. The computer readable medium according to claim 31 further comprising:

code adapted to provide a simulator allowing one or more hypothetical adjustments to the at least one credit account based on said one or more preferences of the customer regarding said predetermined payment hierarchy which alters a payment allocation and a balance distribution among said default bucket and said one or more promotional buckets.

33. The computer readable medium according to claim 32 further comprising:

code adapted to determine a status of said the at least one credit account based on said one or more hypothetical adjustments.

34. The computer readable medium according to claim 31, wherein said code adapted to update said the at least one credit account further comprises code adapted to re-calculate, for at least one of said default bucket and said one or more promotional buckets, pricing information comprising one or more of the following:

an annual percentage rate;

an effective annual percentage rate;

a jurisdiction-specific annual percentage rate;

a transactional fee;

a finance charge; and a rewards amount.

35. The computer readable medium according to claim 31 further comprising—
- code adapted to communicate to the customer at least one piece of pricing information comprising one or more of the following:
  - one or more annual percentage rates associated with either said one or more promotional buckets or said default bucket;
  - one or more effective annual percentage rates associated with either said one or more promotional buckets or said default bucket;
  - one or more aggregated annual percentage rates associated with the at least one credit account;
  - one or more effective annual percentage rates associated with the at least one credit account; and
  - one or more jurisdiction-specific annual percentage rates associated with the at least one credit account.

36. The computer readable medium according to claim 31 further comprising:
- code adapted to transfer at least part of a balance associated with one bucket to another bucket wherein said one bucket may comprise any one of the one or more promotional buckets or the default bucket and said another bucket may comprise the default bucket or any one of the one or more promotional buckets.

37. A computer readable medium having code for causing a processor to provide promotional pricing, the computer readable medium comprising:
- code adapted to provide one or more pricing offers to one or more customers who have one or more credit accounts;
- code adapted to determine whether a transaction associated with at least one credit account of a customer credit account qualifies for said one or more pricing offers based on at least one predetermined criterion;
- code adapted to assign a balance incurred through said transaction to a promotional bucket associated with a particular pricing offer if said transaction qualifies for said one or more pricing offers, or assigning said balance to a default bucket if said transaction does not qualify for said one or more pricing offers, thereby causing a total balance associated with said the at least one credit account to be distributed among said default bucket and one or more promotional buckets;
- code adapted to apply fees and charges to said default bucket and said one or more promotional buckets based at least in part on said one or more pricing offers; and
- code adapted to allocate payments associated with said the at least one credit account to said default bucket and said one or more promotional buckets according to a predetermined payment hierarchy wherein (a) the predetermined payment hierarchy determines the allocation of payments amongst the default bucket and the one or more promotional buckets, and (b) wherein said predetermined payment hierarchy is retroactively adjustable to cause at least one past payment to be re-allocated among said default bucket and said one or more promotional buckets based at least in part on one or more preferences associated with the customer.

38. The computer readable medium according to claim 37 further comprising:
- code adapted to communicate, to the customer, pricing information related to the transaction via electronic means, wherein said pricing information comprises an annual percentage rate and wherein said electronic means comprises at least electronic alerts; and
- code adapted to provide said the customer an option to modify said pricing information.

\* \* \* \* \*